INVENTOR.
MASAHIKO OKAMOTO

FIG. 7

United States Patent Office 3,405,888
Patented Oct. 15, 1968

3,405,888
FLYING BODY CONTROL SYSTEM AND
APPARATUS
Masahiko Okamoto, 56 2-chome, Miyamaecho,
Kanagawaku, Yokohama, Japan
Continuation-in-part of application Ser. No. 606,691,
Aug. 28, 1956. This application July 1, 1964, Ser.
No. 379,602
7 Claims. (Cl. 244—3.14)

This invention relates to a system and apparatus for controlling the line of flight of unmanned flying bodies, for example, guided missiles, projectiles, torpedoes, to a target upon being initially directed toward the target, whether the target itself is stationary or moving.

The instant application is a continuation-in-part of my application Ser. No. 606,691, filed Aug. 28, 1956, now abandoned.

An object of the invention is to provide a simple steering apparatus incorporated in the flying body, of light weight and minimum space requirements which will nevertheless effectively guide the body to its target.

Another object of the invention is to steer a flying body, rotating slowly in a predetermined direction about its own major longitudinal axis, by a single means responsive to the deflection of the flying body from a reference or base line, whether the body be of the type working under the control of a directive signal from a base within, or external to, the body itself.

Still another object is to steer a moving or flying body by repeatedly steering it by a unidirectional instantaneous operation so as to avoid, or substantially minimize, hunting of the freely moving or flying body because of overshooting the required line of movement or flight.

Still another object is to provide simplified equipment based on using conical polar coordinates in ground control systems for generating and transmitting control signals.

Still another object is to provide a flying body with a single helical vane or blade, or a plurality thereof, on its cylindrical external surface to rotate the body in free flight slowly about its longitudinal axis with a deflection rudder movable in but one predetermined direction to steer the body to its target.

The foregoing, and other, objects and features will become readily apparent from the following description of an illustrative embodiment of my invention when read in conjunction with the accompanying drawing, in which.

Figure 2:
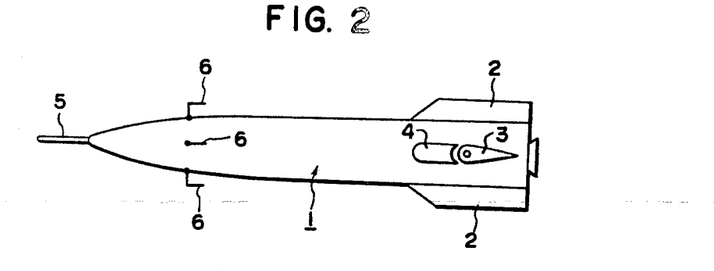
FIGURE 2 is a highly simplified external view of one form of the rotating flying body which may be controlled in flight by the system of my invention, for example, that shown in FIGURE 1.

Referring to the drawing, and more particularly to FIGURE 2 thereof, flying body 1, an unmanned airborne misile for example, is of the type having at least one twisted, skewed or helical vane 2 extending in the general direction of the major and longitudinal axis of body 1 on the exterior cylindrical surface thereof, two vanes spaced at 180° from each other being shown in the embodiment of FIGURE 2. Body 1 is an elongated cylinder having a conical nose at its forward end with vanes 2 thereof positioned in its rearward or aft region and at a slight angle to its longitudinal axis. This arrangement of the vanes causes the body, after launching in free flight, slowly to rotate about such longitudinal axis at about two to ten revolutions per second. In front of and aligned with each rudder component 3, a stabilizing fin 4 may be provided on the flying body. At about 90° from vane or vanes 2, deflection rudder components 3 extend from the body at such rearward region. Rudder components 3 are jointly movable always in the same direction by a common mechanism, as hereinafter described. The body also has a transmitting, preferably unipole, antenna 5 for transmitting information as to its instantaneous angle of rotation about its major longitudinal axis and one or more receiving antennas 6 for reception by the rudder deflecting mechanism within body 1 of the deflection steering data signals from its base point, for example the ground station of FIGURE 1. Transmitting antenna 5 is shown as extending from the nose of the body, aligned with the major principal axis of the body, while the receiving antennas 6 extend from an intermediate region of body 1, four antennas 6 being shown in FIGURE 2 spaced at 90° intervals about its circular periphery, but the location of antennas 5 and 6 is not limited to that shown.

Figure 1:
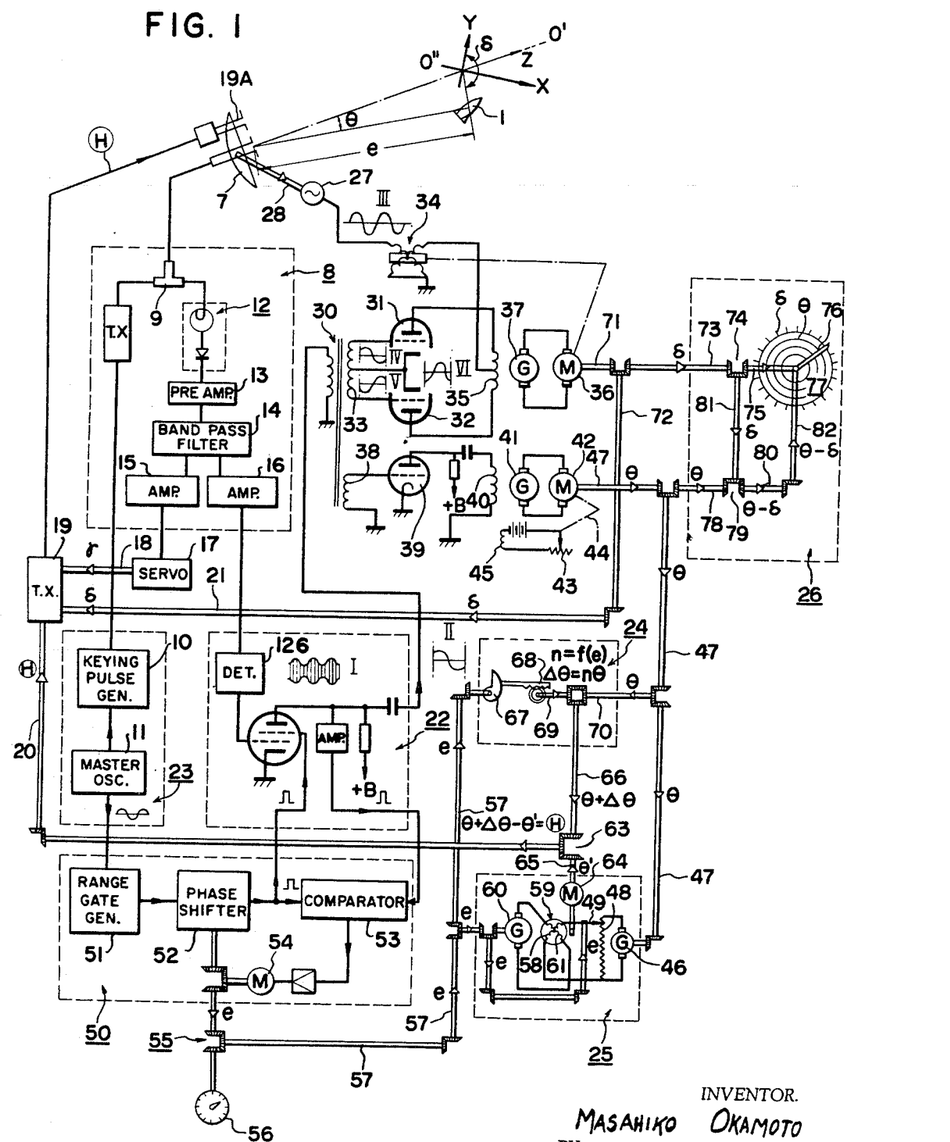
FIGURE 1 is a schematic or diagram of the total guidance and control system of my instant invention incorporated in a ground control station external to a freely flying body controlled by the signals from such ground station as the base point.
Figures 3, 4, 5:
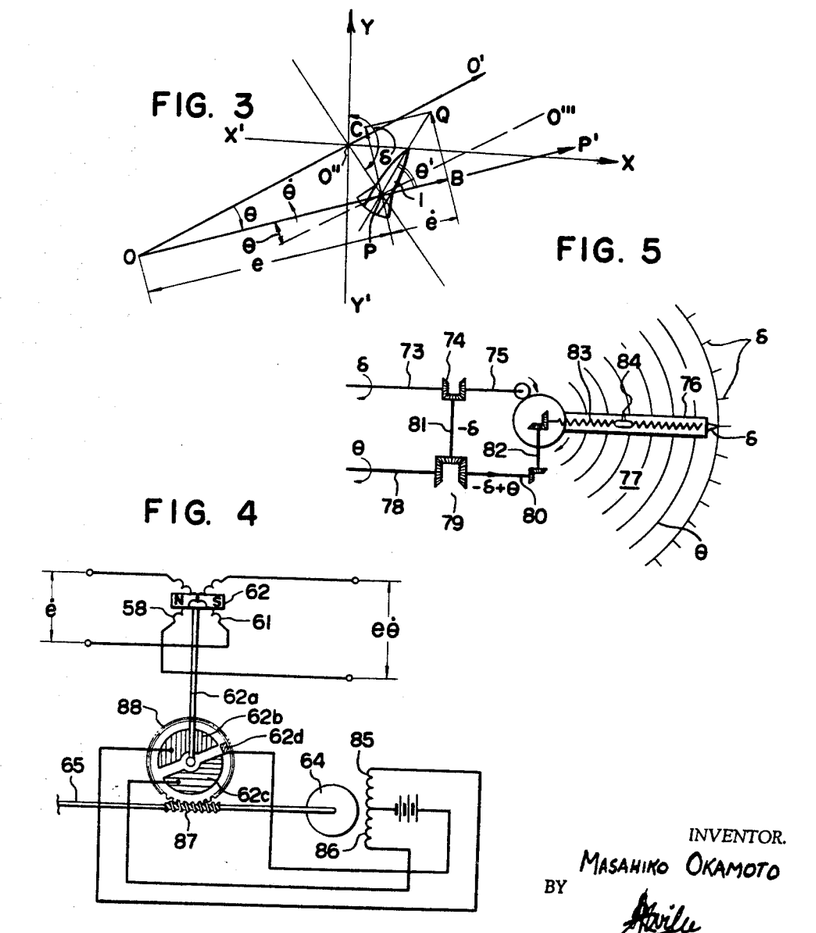
FIGURE 3 is a diagram to assist in explaining principles on which my instant invention is based as applied to a flying body guided by control signals from a base point which may be either a ground fixed station or a manned aircraft.
FIGURE 4 shows the detail of a cross-coil relay of the variation unit utilized in the system of FIGURE 1.
FIGURE 5 shows the details of the visual indicator of the system of FIGURE 1.

In FIG. 3, line OO′ is the reference line in space which connects the launching point O of flying body 1 and the target position at point O′, while P denotes an instantaneous position of the flying body 1 after launching. Plane XO″Y passing through point P is perpendicular to the reference line OO′, where X-axis and Y-axis, perpendicular to each other, are provided within the plane with the point O″, which is the cross point of the reference line OO′ and the plane XO″Y, as the original point. Line OP′ is an extension of line OP, while PQ shows the flight direction of the flying body 1. Then the space position of point P relative to point O is fixed by angle YO″P=δ in the plane XO″Y, angle O″OP=θ in the plane O′OP′ and distance e from the point of origin O to point P. It should be noted that angle δ is the angle of rotation in space of the flying body current position, angle θ is the angle of deflection in space of the flying body current position, and distance e is the range to flying body current position. These three values, i.e. δ, θ and e, are measured by the radar transmitter-receiver 8 of a known type of the ground control station apparatus (FIG. 1). Angle δ is determined through a direction determining channel 22 and a circuit including the secondary winding 33 of a transformer 30, amplifier tubes 31 and 32, field coil 35, generator 37, motor 36, and shaft 71 of the motor 36. Angle $\theta$ is determined over a circuit including the second secondary winding 38 of the transformer 30, amplifier tube 39, field coil 40 of generator 41 and second field coil 45 of the generator, motor 42 and coupling 44, shafting and gearing 47. Range $e$ is determined by a range servo 50.

Figure 7:
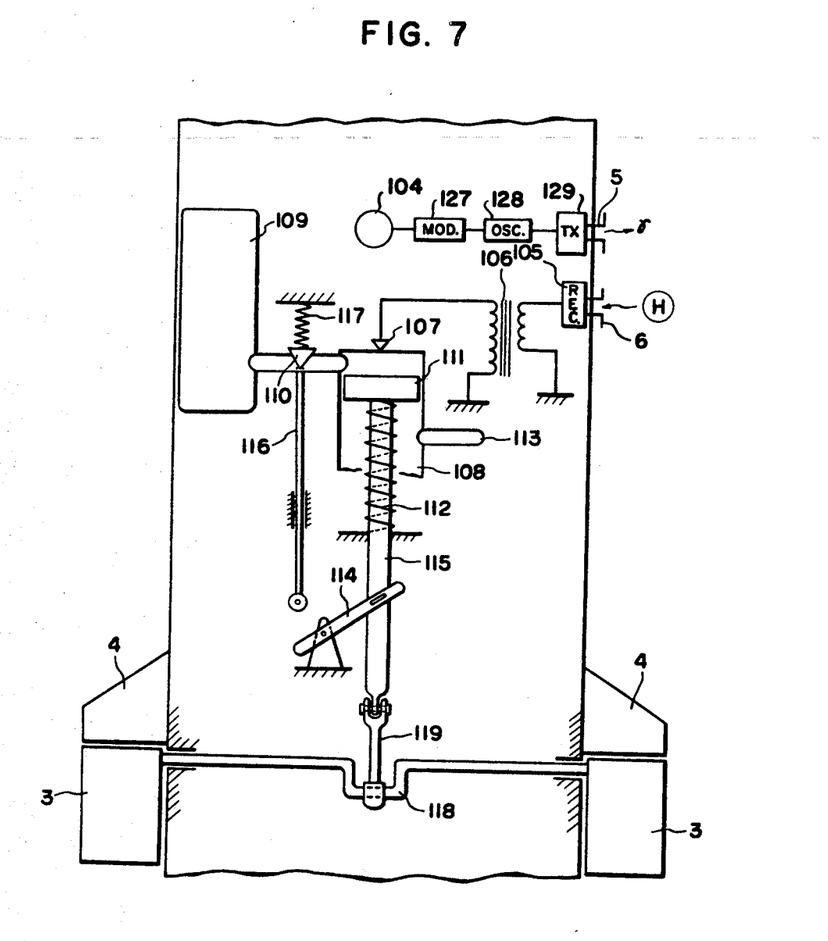
FIGURE 7 is a diagram, highly simplified, of the controlled mechanism within the flying body for its rudder which is responsive to the signals it received from the system of FIGURE 1.

On the other hand, spin rotation angle (spin angle) $\gamma$ i.e. the instantaneous angle of spin rotation of the flying body about its major longitudinal axis, is detected by a conventional free-gyro 104 (FIG. 7). The value of the signal developed by the gyro 104 modulates a subcarrier oscillator 128 through a first subcarrier modulator 127 to modulate $\gamma$-transmitter 129. The transmitter transmits an electrical wave having the same wave length as of the radar transmitter-receiver by the transmitting antenna 5 which is received by the scanner antenna 7 of the radar 8 together with the reflected wave of the electrical wave radiated by the radar 8 to the flying body 1. The spin angle signal is separated from the reflected wave by a band pass filter 14 in the radar transmitter-receiver 8, and the separated wave is amplified by a first subcarrier amplifier 15 (FIG. 1) and supplied to servo 17, where angle $\gamma$ is converted to angular rotation. On the other hand, the reflected wave which has been modulated by the scanning of the scanner antenna 7 is discriminated and separated from the first subcarrier in the band pass filter 14 with the aid of a filter tuned with second subcarrier frequency corresponding to the scanning frequency of the scanner antenna 7. Thus separated, the second subcarrier is, after amplification by a second subcarrier amplifier 16, amplified by videoamplifier 126 in the direction-determining channel 22, and is demodulated so that an envelope having wave from I is detected.

On the basis of the demodulated envelope having the wave form I and the output wave form III of A.C. generator 27 directly coupled to the scanner antenna 7, angles $\delta$ and $\theta$ are obtained at shafts 71 and 47, respectively, as will hereinafter be described. Angles $\delta$ and $\theta$ are indicated by a visual indicating unit 26 and simultaneously, the angle $\delta$ is transmitted to a deflection steering signal transmitting device 19 through the shafting and gearing 71 and 21. Angle $\theta$ is transmitted to asymptotic path computer 24 and rate variation measuring unit 25 through the shafting and gearing 47.

Explanation of how the scanner antenna 7 detects angles $\delta$ and $\theta$ relating with the current position P of the flying body 1 will now be made. When the point P is on the line OO', the electrical wave reflected by the flying body could not be modulated by the scanner antenna 7 so that there exists no second subcarrier and there is no input signal on second subcarrier amplifier 16. When the point P is not on the line OO', i.e. $\delta$ and $\theta$ exist, second subcarrier output corresponding to the scanner frequency is obtained by the second subcarrier filter in the band pass filter 14 and given to second subcarrier amplifier 16 as its input and is amplified therein, the wave form thereof being received amplitude modulation and shown in the wave form I. This wave form I is demodulated by the second subcarrier detector 126 as before mentioned. The phase difference between the envelope of the wave form I and the output wave form III of A.C. generator 27 directly coupled to the scanner antenna 7 gives the angle $\delta$, while the degree of modualtion of the wave form I gives the angle $\theta$. Consequently, by measuring the phase difference between the envelope of the wave form I and the wave form III, angle $\delta$ is determined, and by measuring the degree of modulation of the wave form I, angle $\theta$ is determined.

It follows that to restore the flying body from its instantaneous or current position P back to base line OO', the steering must preferably be such as to permit the flying body to follow a course simultaneously taking into account the particular values at point P of angles $\delta$ and $\theta$ so that the control signal transmitted to the flying body will so steer the body that angle $\theta$ will be zero so as to constantly maintain angle $\theta$ at zero, and the instantaneous steering signal must be applied at the instant when the flying body spin angle $\gamma$ is equal to the angle $\delta$.

Inasmuch as point P, as defined by angles $\delta$ and $\theta$, is merely located as to its position in space, the orientation of the flying body per se is not defined thereby. A third value is required to guide the body in proper orientation to the target. The means for determining this additional third value at the receiver of the ground station, and for transmitting the necessary correction to the flying body, will be herein described at a later time. At this time it should be noted that even though point P at a certain time may be on base line OO', if the orientation of the flying body is other than in the direction of the line OO', the target will not be struck as a rule; while if point P be not on base line OO' but the flying body is oriented appropriately in the target direction, the target may be struck without deflection steering.

It follows therefore that in the ground control system it will not suffice merely to observe and detect only the angle of deflection $\theta$ for a current position P of the flying body; it is also necessary constantly to measure the rate of variation in the position of point P so that the momentary flight direction of the flying body is continuously known. For ease of understanding, the device for continuously measuring the flight direction of the flying body will be termed the "rate variation measuring unit" at point P. The necessary elements to be applied to the rate variation measuring unit are the deflection angle $\theta$ and the distance $e$ from the point of origin O to the then position of the flying body P. The important factors then to be measured in the rate variation measuring unit are the rates of variation with time both of angle $\theta$ and the length $e$, that is, $$\frac{d\theta}{dt}=\dot{\theta}$$

and $$\frac{de}{dt}=\dot{e}$$

as also $$\tan^{-1}\frac{e\dot{\theta}}{\dot{e}}=\theta'$$

that is, the angle between PP' of line OP extended, and line PQ' coinciding with the flight direction of the flying body at point P, assuming $$\frac{d\delta}{dt}=0$$

Hereinafter, angle $\theta'$ will be designated the "course angle" of the flying body. Hence, when the angle of deflection $\theta$ of the flying body is observed in the control system, and the course angle $\theta'$ is computed by the variation rate measuring unit, the sum of the deflection angles, $\theta+\theta'$, is known. If this sum $\theta+\theta'$ is transmitted to the flying body 1, the flying body will be guided to become parallel with the line OO' but will not strike the target. To strike the target, an additional control amount of $\Delta\theta$ is necessary. In view thereof, it is necessary to assume a suitable and ideal path for the flying body to follow for guiding the flying body onto the base line OO'. This path is a certain predetermined path which passes through the point P and asymptotically approaches the base line OO'. When assuming $\Delta\theta$ as an angle made between the tangential line at the point P and the base line OO', then this $\Delta\theta$ is given by a function of the angle $\theta$ of deflection in space of the current position of the flying body. The total angle of change $\circledH$ by adding $\Delta\theta$ to $\theta+\theta'$ is given to the flying body 1 as a control quantity for guiding it positioned at the point P onto the base line OO' via the predetermined asymptotic path. The control quantity $$\circledH=\theta+\theta'+\Delta\theta$$

is fed to the deflection steering transmitting device 19 through the shaft 20 (FIG. 1), and is transmitted to the flying body from the antenna 19A. It should be noted about the nature of the control quantity Ⓗ that $\theta$ and $\Delta\theta$ are always positive values but $\theta'$ is either positive or negative, because when the line PP' is approaching to the base line OO', i.e. as $\theta$ is decreasing, $$\frac{d\theta}{dt}=\dot{\theta}<0$$

and $e\dot{\theta}$, about which aforementioned, is a negative value, while $e$ is always a positive value. Consequently, $$\theta'=\tan^{-1}\frac{e\cdot\dot{\theta}}{e}$$

will be negative, i.e. $\theta'<0$. On the other hand, when the line PP' is departing from the line OO', i.e. as $\theta$ is increasing, $e\dot{\theta}$ is positive value, and consequently, $$\theta'=\tan^{-1}\frac{e\cdot\dot{\theta}}{e}>0$$

It follows therefore that the control quantity Ⓗ will be $$Ⓗ \lessgtr 0$$

however, a deflectional steering signal should be transmited only when Ⓗ>0, but the signal should not be transmitted when Ⓗ≦0, because according to the present invention, unidirectional steering system is employed (FIG. 7), in other words, the deflecting steering of the flying body is made always in one direction.

Hereinafter, the expression "asymptotic path computer" is used to denote the device which computes the angle $\Delta\theta$. Quickly to form the asymptotic path, $\Delta\theta=n\theta$ may be selected, where $n$ preferably equals $f(e)$, which is the function of the distance $e$, i.e. the range to the current position of the flying body 1.

As has been stated, the flying body is provided with one or more helical vanes or blades at its aft end region which, in flight, causes body 1 to rotate about its major longitudinal axis in a predetermined direction. By transmitting to the flying body the deflection steering datum Ⓗ$(=\theta+\Delta\theta+\theta')$ at the moment when the instantaneous angle of rotation of the flying body about its major longitudinal axis, $\gamma$, as detected by a position-gyro within the flying body, is substantially identical with the angle of rotation $\delta$ of the conical polar coordinates of the flying body as shown by the visual indicating system at the ground control station, the flying body immediately steers the deflection rudder components in response to such received order or control signal. By the repeated steering of the flying body when it is in such rotated position, the flying body is guided to, and along, the predetermined base line OO'.

Having briefly summarized the essential principles of the flying body control system of my invention, I proceed to describe the complete system as incorporated in an illustrative embodiment in the form of a ground station used as the control point for the system. Referring to FIGURE 1, flying body 1 is continuously conically scanned by antenna system 7 of the radar transmitter-receiver 8 of prior known type of the ground control station apparatus, which transmitter-receiver includes a magic T, or other similar type of transmit-receive switch, 9, by way of which a keying pulse generator 10, supplied by a master oscillator 11, can transmit to the flying body, while the ground station can receive the angle of spin rotation $\gamma$ which is sent from the antenna 5 of the flying body 1 and detect the angle of deflection in space $\theta$ and the angle of rotation in space $\delta$ of the current position of the flying body around the axis of the line OO' by receiving the reflect wave from the flying body. These operations can be achieved by the receiver 12, preamplifier 13, band pass filter 14, first subcarrier amplifier 15, second subcarrier amplifier 16 provided in the radar transmitter-receiver 8, and the direction determining channel 22.

The output of first subcarrier amplifier 15 is applied to a servo-motor 17 of which output shaft 18 is mechanically coupled to deflection steering signal transmitting device 19. It is here to be noted that the input of deflection steering signaling device 19 is also mechanically coupled by shaft 20 to both asymptotic path computer 24 and rate variation measuring unit 25, and by shaft 21 to the visual indicating unit 26.

Radar pulses transmitted from the ground station in known manner are reflected from the flying body, and the reflected wave received and amplified by second subcarrier amplifier 16 is applied to the direction determining channel 22 having the wave form I.

As is apparent in the light of the known radar technique, when the flying body 1 is not on the base line OO', the output of the second subcarrier amplifier 16 has the wave form I modulated by the second subcarrier frequency which is the same as the conical scan frequency of the scanner antenna 7. The envelope of the wave form I represents an amplitude modulation equal to the frequency of the second subcarrier and the fine lines in the wave form I represent echo pulse trains corresponding to radar pulse recurrence frequency. The output signal detected and gated by the direction determining channel 22 is an alternating current sinusoidal signal having the wave form II, which is the envelope extracted from the wave form I. The phase difference between the envelope of the wave form I and the output wave form III of the reference A.C. generator 27 gives the angle $\delta$, while the amplitude of the wave form II gives the angle $\theta$.

The output wave form II of the direction determining channel 22 is fed to the primary winding of the transformer 30, so that on the secondary winding 33 of the transformer 30, the wave forms IV and V, of which the phases being different by 180° to each other, are obtained, which are applied to the control grids of the amplifier tubes 31 and 32, respectively. The tubes 31 and 32 are connected in push-pull, and the output wave form VI of the secondary coil of the goniometer 34 is applied through the field coil 35 of the generator 37 to the anode thereof. On the primary side of the goniometer 34, the output wave form III of the reference A.C. generator 27 is applied.

The rotating shaft of the goniometer 34 is directly coupled to the output shaft of the motor 36, and the phase difference between the wave forms III and VI is equal to the rotating angle of the goniometer and therefore the rotating angle of the motor 36. If it is assumed that the rotating angle of the motor 36 or the rotating angle of the rotating shaft of the goniometer 34 is $\delta$, under the above mentioned connection, when the phase difference between the wave forms II and VI equals to 90°+$\delta$, the bridge consisting of the tubes 31, 32 and the field coil 35 of the generator 37 will be balanced to stop the motor 36. Consequently, when the phase difference between the wave form III of the generator 27 is applied to the primary of the goniometer 34 and the output wave form II of the direction determining channel 22 becomes $\delta$, the motor 36 is stopped and the angle $\delta$ is detected on the shaft 71. If the phase reference of the generator 27 is given in the direction of O″Y of Y-axis, and the angle of rotation in space around the OO' axis of the current position of the flying body is $\delta$, then the phase difference between the wave forms II and III becomes $\delta$ so that the motor shaft stops at $\delta+90°$. Therefore, when the phase reference of the generator 27 is given in the direction of O″X' of X-axis, the motor shaft 71 will stop always at the rotational angle $\delta$. In other words, the angle of rotation in space around the OO' axis of the position of the flying body is directly detected on the shaft 71.

The voltage induced on the second secondary winding 38 of the transformer 30 is amplified and rectified by the amplifier tube 39 to apply a D.C. current proportional to the amplitude of the wave form IV to the field coil 40 of the generator 41 to rotate the motor 42 by the voltage developed by the generator 41. The rotation of the motor 42 moves sliding contact of a variable resistor 43 directly coupled to the shafting and gearing 47 of the motor 42 so that a current of the opposite polarity flows into the second field coil 45 of the generator 41 to cancel the flux of the field coil 40 of the generator to balance the current flow into the coils 40 and 45. When the currents are balanced, the motor 42 stops. The angular position of the stopped shaft 47 is proportional to the amplitude of the wave form IV and thus the angle of deflection $\theta$ in space of the position of the flying body 1 is detected on the shaft 47.

The deflection angle $\theta$, as indicated by the rotation of the shaft of motor 42, is transmitted to the rotatable shaft of generator 46 of the rate variation measuring unit 25 through coupling shaft and gearing mechanism 47; the voltage generated by generator 46 being thus proportional to $\theta$. This generated voltage is applied to a resistor 48. A slide contact 49 movable by the range servo 50 is provided for the resistance 48, the position of the slide contact being thus directly proportional to the magnitude of the distance signal $e$. Hence the voltage applied to coil 58 of cross-coil relay 59 is proportional to $e\theta$. Since the $e$ distance signal is applied to the rotor of generator 60, the rate of variation of signal $e$ is represented by the voltage induced, and the output voltage of generator 60 is proportional to $\dot{e}$. Range servo 50 includes range gate generator 51, of which the voltage input is supplied from master oscillator 11 while its output is connected to the input of phase shifter 52 whose output is applied, directly to one input side of comparator 53, and indirectly by way of direction channel 22 and the amplifier thereof to a second input side of comparator 53, of which the output is supplied by motor 54 and a shafting and gearing mechanism 55 both to phase shifter 52 as also a visual indicator 56 of distance $e$. By way of another shafting and gearing mechanism 57, the value of distance $e$ is applied mechanically to both asymptotic path computer 24 and rate variation measuring unit 25. The output voltage from generator 60 being applied to the other coil 61 of cross-coil relay 59, and the voltage $e\theta$ being applied to winding 58, the angle of rotation $\theta'$ of rotor 62 of cross-coil 59 is thus equal to $$\tan^{-1}\frac{e\theta}{\dot{e}}$$

which is the course angle $\theta'$ of the flying body. Angle $\theta'$ is fed into the adder mechanism 63 by means of a differential-gear type mechanism in which it is added to $\theta + \Delta\theta$ supplied to the adder from asymptotic path computer 24 thus giving the value of deflection datum Ⓗ to the output shaft 20 of the adder mechanism 63, shaft 20 as above stated coupling mechanically to the input of direction steering signal transmission unit 19. Rotation of rotor 62, coupled by way of cross-coil relay 59 to the rotor of motor 64 on shaft 65 coupling rate variation measuring unit 25 to adder 63, rotates the differential gearing of the latter, the rotation of shaft 66 from asymptotic path computer 24 also being applied to adder mechanism 63. Formed cam 67 of computer 24 has a predetermined lift path which is a function of distance $e$, and is rotated by shaft 57 and gearing 55 in an amount corresponding to the instantaneous value of $e$ as received from the flying body. Rotation of cam 67 displaces cam-follower rack 68, rotating another shaft and gear mechanism 69 from which shaft 66 is rotated and to which the rotation of shaft and gear mechanism 47 from the visual indicating unit 26 is applied by way of shafting 70.

The rotor of motor 36 is connected by shaft 71 through gearing to shaft 73 which in turn rotates a shaft 75 through a differential gear 74. The shaft 75 rotates an indicator arm 76 (FIGURES 1 and 5) over a graduated scale 77 to give a direct reading of the rotation $\delta$ of motor 36 corresponding to the instantaneous value of the angle received from the flying body. This direct reading is made by means of a $\delta$-pointer at the free end of arm 76 moving over the $\delta$-graduations of scale 77.

Direct reading of the rotation $\theta$ of motor 42 is obtained through the drive of a shaft 78 through gearing by the shaft 47 of motor 42. The shaft 78 and a shaft 81 driven by the differential 74 forms the inputs for a differential 79 having an output shaft 80. The shaft 78 feeds into the differential 79 the angle $\theta$ and the shaft 81 feeds in the angle $\delta$, the shaft 80 thus being rotated through an angle $\theta-\delta$. This angular difference by a shaft 82 is fed to a feed screw 83 within the indicator arm 76 (FIGURE 5) to move an indicator 84 over the concentric zones of angle $\theta$ on scale 77 to permit direct reading of the angle $\theta$.

Cross-coil relay 59 of rate variation measuring unit 25 is shown in greater detail in FIGURE 4 which shows rotor 62 thereof as being of a permanent magnet on the shaft 62a. A switching device comprising two conductive segments 62b and 62c are connected to field coils 85 and 86 respectively of motor 64. The two motor field coils are connected through a local source of DC potential to brush 62d engaging the segments 62b and 62c with very little friction, so that shaft 62a rotates to position $\theta'$ independently of the position of contact brush 62d. The brush 62d is driven by worm 87 on shaft 65 and worm wheel 88. Thus shaft 65 rotates to position $\theta'$ without regard to the position of 62d. Should there be a deviation in the position of brush 62d relative to the $\theta'$ position of shaft 65, current flows in field coil 85 or 86 depending on the direction of the deviation, so that the shaft of motor 64 rotates to cancel the deviation.

Figure 6:
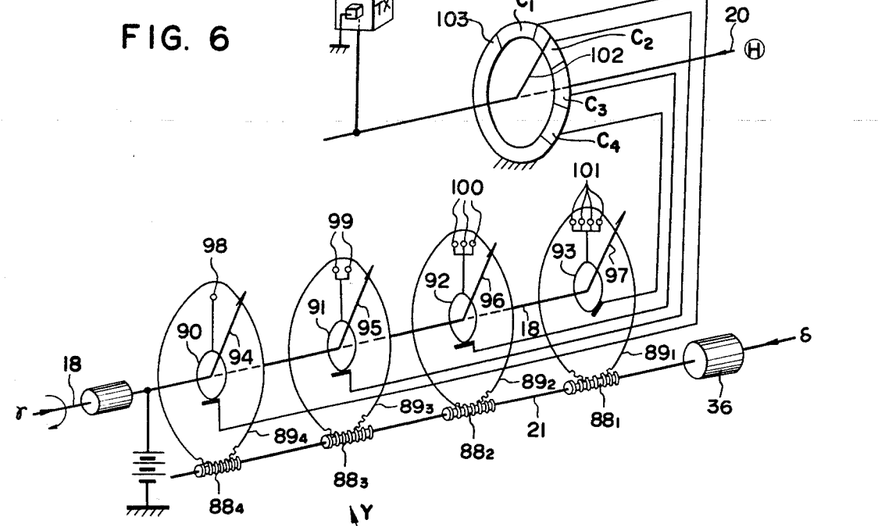
FIGURE 6 is a detailed diagram of the steering control signal transmitter of the ground control station of FIGURE 1 by which the composite of the angle of rotation of the flying body, as detected by the detector of the system of FIGURE 1, and the correction datum as determined by the apparatus of FIGURE 1, is transmitted to the flying body.

Deflection steering signal transmitting unit 19 is shown in greater detail in FIGURE 6. As aforementioned, the deflection steering signal must be sent at the instant when the spin rotation angle $\gamma$ of the flying body coincides with the angle of rotation in space $\delta$ around OO' axis of the position of the flying body, and for this purpose, the spin rotation angle $\gamma$ is introduced into the steering signal transmitting device 19 through $\gamma$-servo 17 and the output shaft 18 of the servo 17. On shaft 18, brushes 94 through 97 are provided (FIGURE 6) rotatable with the speed of, for example, ten revolutions per second in synchronizing with the spin rotation of the flying body 1. On the other hand, the angle of rotation in space $\delta$ around OO' axis of the position of the flying body 1 measured by the radar is transmitted through the motor 36 and shaft 21. On the shaft 21, four worms $88_4$, $88_3$, $88_2$, and $88_1$ are provided so as to transmit the rotation of the shaft 21, i.e. the angle $\delta$, to worm wheels $89_4$, $89_3$, $89_2$ and $89_1$, respectively, so as to rotate these wheels by the angle $\delta$. On these wheels, slidable or slip rings 90, 91, 92, and 93 and single contact array 98, pair of contacts array 99, three contacts array 100 and four contacts array 101 are provided, respectively, and said brushes 94, 95, 96 and 97 slide thereon rotating in synchronization with the spin rotation of the flying body. Consequently, every time when $\gamma$ and $\delta$ coincide with each, contacts arrays 98, 99, 100 and 101 are arranged to make and break once during each rotation. Thus at single contact array 98 one pulse is generated, at the pair of contacts array 99 two pulses, at the three contact array 100 three pulses and at the four contacts array 101 four pulses are generated, respectively. These contact arrays 98 through 101 are connected to the segments $C_1$, $C_2$, $C_3$ and $C_4$ of the fixed ring 103 through slip rings 90 through 93, respectively. At the fixed ring 103 is provided a brush 102 which is rotated by the control quantity Ⓗ transmitted from the shaft 20 to slide on the segments $C_1$ through $C_4$. As observed from FIGURE 6, the brush 102 engages either of the segments $C_1$ to $C_4$ when Ⓗ$>0$, however, it does not engage any of the segments when Ⓗ$\leq 0$.

For deflection steering, it is necessary to discriminate, in addition to know the coincidence of $\gamma$ and $\delta$ as aforementioned, the amount of the control quantity Ⓗ. The control quantity Ⓗ is classified into four grades, each grade corresponding to one pulse, two pulses, three pulses and four pulses, respectively, of the signal amount of the deflection steering signal produced at the contact arrays 98 through 101, in such a manner that as the amount of the control quantity Ⓗ increases, the number of pulses are increased.

The current from the battery in FIGURE 6 actuates the transmitter of the deflection steering device 19 through the circuit comprising shaft 18, brushes 94 through 97, contact arrays 98 through 101, slip rings 90 through 93, segments $C_1$ through $C_4$ and brush 102.

With the arrangement of the circuit, through any one of the segments $C_1$, $C_2$, $C_3$ and $C_4$ selected by the position of brush 102 which is determined by the amount of the control quantity Ⓗ, the steering pulse signal of one, two, three or four pulses is transmitted from the antenna 19A of the deflection steering signal transmitting device 19.

Having specifically, and in detail, described the ground control portion of the flying body guidance system of the instant invention as applied to a body in flight responsive to signals from a fixed base on the ground, the structure within the flying body which receives the steering signals Ⓗ, shown in FIGURE 7, will now be described. Position-gyro 104 contantly indicates and detects the slow rotation γ of body 1 in flight around its own major axis, transmitter 5 connected to gyro 104 constantly transmitting the instantaneous values of such angle of rotation γ in the form of a signal wave to the ground control station. The use to which the received γ signal is put at the ground station has been above described. The mechanism of major importance within flying body 1 is obviously the steering device responsive to the deflection steering datum Ⓗ transmitted by control signal transmitter 19A. The steering signal so transmitted is picked up by antenna, or antennae, 6 of receiver 105 in the flying body, and is applied by the receiver to the primary of transformer 106 of an electric spark ignition apparatus to produce the required high voltage from the transformer secondary to fire ignition spark plug 107 connected to such secondary. Ignition plug 107 is disposed in the top region of a closed cylinder 108, the top region being connected to a source or tank 109 of a highly compressed combustible gaseous fuel by way of valve 110. A piston 111 within cylinder 108 is biased by spring 112 toward the top region of cylinder 108 to compress the fuel in the cylinder above the piston, so that when plug 107 fires, piston 111 is driven downwardly against such bias and actuates a mechanical linkage, comprising essentially of a crankshaft 118 and link 119 connecting the crankshaft to piston rod 115, the crankshaft having deflection rudder components 3 at its ends external to body 1. Just before piston 111 reaches its lowermost position, exhaust 113 is opened by valve means (not shown but well known in the art of internal combustion engines) so that the burnt gas may on the return stroke of the piston be exhausted from the cylinder. The piston return stroke is under the bias of spring 112, and fuel valve 110 is opened by way of pivoted lever 114, one end of which is pivotally linked to piston rod 115, the other end thereof being connected to valve 110 by a valve rod 116 so as to open valve 110 against the bias of spring 117 tending at all times to close valve 110, to admit a new charge of the highly compressed fuel to cylinder 108 from tank 109. The opening of fuel valve 110 occurs when the piston reaches its lowermost position, just before the return stroke of the piston begins, and while exhaust port 113 is still open, so that the inrushing highly compressed gaseous fuel fills cylinder 108 and at the same time scavenges the spent gases from the cylinder. Since the pressure prevailing within the cylinder is relatively low as compared to the restoring force of spring 112, piston 111 moves rapidly upward and after exhaust port 113 is closed by the upward movement of the piston, the new charge of combustible gas in the cylinder is compressed, and the explosion motor parts restore to the position shown in FIGURE 7. In the meantime, the end of lever 114 has disengaged the end of valve rod 116 permitting spring 117 to close valve 110. This action is repeated at successive intervals wherever a steering signal Ⓗ is received, thus instantaneously operating deflection rudder components 3 on crankshaft 119.

A flying body, of the type to fly under the control of signals from a fixed station incorporating the guidance system of my instant invention has the advantages, inter alia, over flying bodies guided by prior known steering systems based on rectangular coordinates:

(1) In the prior known steering systems based on rectangular coordinates, the directional rudders and elevators each work in both opposite directions, right and left, and up and down, respectively, which necessarily require bulky and heavy apparatus. In the instant system, the rotation of the flying body about its major longitudinal axis is effected by means of a stationary twisted blade, or a plurality thereof on diametrically opposite surface portions of the exterior of the body, so that only deflection steering is required. Such steering is always in the same direction and instantaneous by means of a relatively simple piston means, permitting of simplicity and light weight.

(2) The instant inventive system does not require two-directional steering and employs asymptotic steering in one direction repeatedly and instantaneously. Hence, anti-hunting measures to counteract overshooting of the desired line of flight are a good deal easier with the instant system than with the prior known systems which steer positively in opposite directions.

(3) While in the prior known systems both the directional rudder and the elevator have to be operated, as stated, to direct the flying body asymptotically closer to the target direction (base line), in the instant system the use of deflectional steering suffices, thus markedly simplifying the structure thereof for this reason also.

(4) In the prior known systems based on rectangular coordinates, analyses of upward, downward, and bilateral displacements are necessary and require complicated apparatus. In the instant system, due to the vector-type conical polar coordinates as the base thereof, relatively simple apparatus is used.

Figure 8:
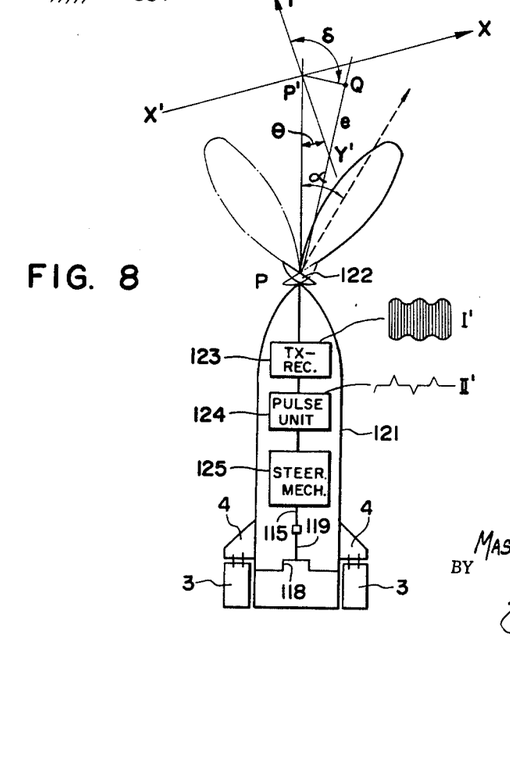
FIGURE 8 is a simplified showing, including block diagrams, of a flying body having a homing device incorporating my instant invention.

In FIGURE 8 a flying body control system according to the instant invention as applied to a body having a homing device, is shown. Letting point P designate the instantaneous position of flying body 121 in free flight, line PP' is its flight direction and Q the target to be hit by body 121. Assuming XP'Y passing through target Q perpendicular to the current flight direction PP', the XY-axis in such plane being perpendicular to P'P, the target Q is definable, in polar coordinates, by (a) angle $YP'Q=\delta$, (b) angle $P'PQ=\theta$, and (c) the length H$e$ of line PQ which is the distance between the instantaneous position of flying body 121 and target Q. Flying body 121, being of substantially the same external construction as to helical or twisted fins, blades, screws or vanes 2, rudder components 3, etc., as flying body 1, will be rotating slowly in one direction around its major axis in free flight. Body 121 has the deflected fixed antenna 122 at the forward end of the body, on its major axis, which at all times will conically scan around such major axis of the flying body according to the rotation of the body in flight. Hence, flying body 121 in space will automatically detect location Q of the target, knowing said angles δ and θ. When thus a reflected wave is received by the fixed antenna 122 in the flying body, the amplitude modulated output of the receiver gives the information of said δ and θ. When target Q is on the line of the flight PP' of the body 121, the received intensity from the entire periphery of scanning is equisensitive, whereas when such target is not on such line of flight, the output of receiver 122 will be modulated to an amplitude dependent upon the angle θ, and the phase of the modulating wave will be representative of the angle of rotation δ. In other words, to have the flying body strike the target, one should by repeated steering extinguish deflection angle θ as the body rotates about its major axis. With such steering repeated during each rotation until the flying body 121 is directed precisely in the target direction, steering for only the angle of deflection θ portion suffices. Hence homing apparatus built into a rotating flying body incorporating the instant system may be made considerably simpler than the prior art apparatus.

Operation of the system of the instant invention as applied to a homing mechanism-equipped rotating flying body is as follows: Waves emitted by antenna 122 of radar transmitter-receiver 123 within the flying body, the antenna fixed at an angle α to the major axis of the flying body, are reflected from target Q and are received back by transmitter-receiver 123. The receiver output will be of the wave form I' and is applied to steering signal device 124 which in turn detects wave form I' and transmits the resultant wave form II', having pulses only at the steepest portions of wave form I', to instantaneous steering device 125. The apparatus indicated by block 125 in FIGURE 8 is substantially identical to that shown in detail in FIGURE 7, the pulses of wave form II' of FIGURE 8 flowing through the primary of transformer 106 eventually resulting in the building up of a sufficiently high voltage to fire spark plug 107 in cylinder 108 as above described. In that each pulse of wave form II' is substantially in phase with wave form I', the instantaneous of the steering apparatus on receipt of each pulse of wave form II', the flying body will change its path in the direction to extinguish deflection angle θ. When the flying body is precisely oriented in the target direction, wave form I' will have a linear envelope so that no pulses are produced in wave form II', so that steering device 125 is not actuated, and hence the flying body continues flying in its current and correctly oriented path.

What I claim is:

1. A system for guiding a flying body rotating unidirectionally at a predetermined speed about its major longitudinal axis in free flight from a control station along a predetermined line of flight to a target, comprising a position gyro and a transmitting device in the body for detecting and transmitting an instantaneous angle γ of spin rotation of the flying body about its major longitudinal axis, a radar transmitter-receiver including a scanning device driving an A.C. generator at the control station to receive a first subcarrier of the spin rotation angle γ transmitted from the flying body, and to receive a second subcarrier reflected by the flying body resulting from the scanning of the body simultaneously with the first subcarrier, the second subcarrier being modulated by the scanning frequency, separating means in the control station for separating the first subcarrier and the reflected second subcarrier received by the radar transmitter-receiver, a direction determining channel for the second subcarrier signal, means to couple the second subcarrier gated by the direction determining channel and the output wave of the AC generator, to obtain an angle δ of rotation in space of the flying body, means for measuring the amplitude of modulation of the reflected second subcarrier gated by the direction determining channel to obtain an angle θ of deflection in space of the flying body, means for measuring the distance e of the flying body from the launching position, a rate variation measuring unit having as inputs the distance e and the angle θ to obtain a course angle θ' of the flying body, a computer having as inputs the distance e and the angle θ to provide an angle Δθ as an additional control amount for the flying body to strike the target, means for obtaining a control deflection datum Ⓗ by combining the deflection angle θ, the course angle θ' and the additional angle Δθ, a deflection steering signal transmitting means in the control station having as inputs the spin angle γ, the angle δ and the deflection datum Ⓗ to transmit a train of pulse signals to the flying body at a time when the spin angle γ and the rotation angle δ coincide, means in the flying body to receive the pulse signals, a unidirectional steerable rudder in the body, and means responsive to the pulse signals to steer the rudder in one direction in accordance with the pulse signals.

2. A system according to claim 1, in which the deflection steering signal transmitting means is actuated but once during each revolution of the flying body about its major longitudinal axis.

3. A system according to claim 1, in which the coupling means comprises a transformer on the primary winding of which is applied the second subcarrier gated by the direction determining channel, two vacuum tubes, the output of a first secondary winding of the transformer being applied to the control grids of the two vacuum tubes, respectively, a goniometer on the primary of which the output of the AC generator is applied forming a reference generation, a generator, a motor driven thereby, the output of the goniometer being applied to the respective anodes of the two tubes through the field coil of the generator, the rotor shaft of the goniometer being directly connected to the output shaft of the motor; when the bridge circuit comprising the two tubes and the field coil is balanced, the motor stops to provide the phase difference between the gated second subcarrier and the wave form of the reference generation, which difference corresponds to the angle δ.

4. A system according to claim 3 in which an amplifier tube is connected to a second secondary winding of the transformer, a second generator and a second motor driven thereby, the amplifier tube applying the obtained D.C. current proportional to the amplitude of the gated second subcarrier to the field coil of the second generator to rotate the motor to obtain the angle of deflection θ.

5. A system according to claim 4 in which a plurality of differential gearing mechanisms is connected to the shafting of the two motors, the first gearing mechanism of the plurality connecting the shafting to the computer and a second gearing mechanism of the plurality connecting the shafting to the rate variation measuring means for determining the rate of variation of the detected deflection signals.

6. A system according to claim 5 in which the computer includes an input shaft rotated in accordance with the measured distance e, a rotatable cam driven by gearing from the input shaft, a rack follower cooperating with the rotation of the cam, a pinion rotatable by the longitudinal displacement of the rack by the rotatable cam, a second shaft, a coupling between the pinion and the second shaft, and a differential gearing mechanism of which a first gear is rotatable with the shafting driven by said second motor driven in accordance with the angle θ, a second gear of the differential being driven by the second shaft, and a third gear of the differential gear mechanism being driven by the first and second gears thereof and coupled to the deflection datum Ⓗ obtaining means.

7. A system for guiding a flying body rotating unidirectionally at a predetermined speed about its major longitudinal axis in free flight from a control station along a predetermined line of flight to a target, comprising a position gyro and a transmitting device in the body for detecting and transmitting an instantaneous angle γ of spin rotation of the flying body about its major longitudinal axis, a radar transmitter-receiver including scanning means driving an AC generator at the control station to receive a first subcarrier of the spin rotation angle γ transmitted from the flying body and to receive a second subcarrier reflected by the flying body due to the scanning of the body simultaneously with the receiving of the first subcarrier, separating means in the control station for separating the first subcarrier and the reflected second subcarrier, means for determining the distance e of the body from the launching position, an angle θ of deflection in space of the body and an angle δ of rotation in space of the body as functions of the output of the AC generator, the second subcarrier and the scanning frequency, means for obtaining a course angle θ' of the flying body by combining the distance e and the angle θ, means for obtaining an additional angle $\Delta\theta$ as a function of the angle $\theta$ and the distance $e$ for an additional control amount for the flying body to strike the target, means for obtaining a control deflection datum ⊕ by combining the deflection angle $\theta$, the angle $\theta'$ and the additional angle $\Delta\theta$, a deflection steering signal transmitting means in the control station controlled by the spin angle $\gamma$, the rotational angle $\delta$ and the deflection datum ⊕ to transmit a train of pulse signals to the flying body at a time when the spin angle $\gamma$ and the rotational angle $\delta$ coincide, means in the flying body to receive the pulse signals, a unidirectional steerable rudder in the body, and means responsive to the pulse signals to steer the rudder in one direction in accordance therewith.

References Cited

UNITED STATES PATENTS

| | | | |
|---|---|---|---|
| 2,737,356 | 3/1956 | Varian et al. | 244—3.21 X |
| 2,745,095 | 5/1956 | Stoddard | 244—3.13 X |
| 2,852,208 | 9/1958 | Schlesman | 244—3.11 |

RODNEY D. BENNETT, *Primary Examiner.*

M. F. HUBLER, *Assistant Examiner.*